United States Patent Office 3,396,139
Patented Aug. 6, 1968

3,396,139
ASBESTOS-MODIFIED THERMOPLASTIC POLYHYDROXYETHERS
Robert H. Snedeker, New Brunswick, N.J., assignor to Union Carbide Corporation, a corporation of New York
No Drawing. Filed Nov. 25, 1964, Ser. No. 414,023
7 Claims. (Cl. 260—37)

ABSTRACT OF THE DISCLOSURE

Thermoplastic compositions having high flexural moduli in excess of $1.0 \times 10^6$ p.s.i. have been prepared from polyhydroxyether reaction products of a dihydric phenol and an epihalohydrin having a degree of polymerization of at least 30 and from about 30 to 50% by weight, based on the weight of a thermoplastic polyhydroxyether, of highly refined Coalinga asbestos.

---

This invention relates to asbestos modified thermoplastic polyhydroxyethers having high flexural moduli and more particularly to compositions containing refined asbestos.

While thermoplastic polyhydroxyethers exhibit excellent physical properties such as tensile strength, impact and abrasion resistance, flexibility, chemical and salt spray resistance and flexibility, they do not possess sufficient stiffness as measured by flexural modulus to be suitable for such structural uses as storm window and screen frames, bobbins in the textile industry, commutators in electric motors and generators and the like. For such end uses, flexural moduli of at least $1.0 \times 10^6$ p.s.i. are necessary, which values are much higher than those of any known thermoplastic polymeric materials. Some glass fiber filled polymers, that is modified polymers, have flexural moduli in this range but their uses are strictly limited by exceptionally poor surfaces due to protrusions of glass fibers.

It is, therefore, an object of this invention to provide modified thermoplastic polyhydroxyethers having enhanced flexural moduli.

It is another object to provide modified thermoplastic polyhydroxyethers having smooth surfaces when molded or shaped into useful structural forms.

Other objects will become apparent to those skilled in the art upon examination of the description of the invention which follows.

These objects have been achieved by asbestos-modified thermoplastic polyhydroxyether compositions consisting essentially of:

(a) Thermoplastic polyhydroxyether and
(b) From about 30 to about 50%, based on the weight of thermoplastic polyhydroxyether, of refined dispersed, and opened asbestos fibers, a special form of asbestos which will be described fully later.

The term "thermoplastic polyhydroxyether" herein refers to substantially linear polymers having the general formula:

$$\text{\textemdash}[D\text{\textemdash}O\text{\textemdash}E\text{\textemdash}O]_n\text{\textemdash}$$

wherein D is the radial residuum of a dihydric phenol, E is an hydroxyl containing radical residuum of an epoxide, and $n$ represents the degree of polymerization and is at least 30 and is preferably 80 or more. The term "thermoplastic polyhydroxyether" is intended to include mixtures of at least two thermoplastic polyhydroxyethers.

The thermoplastic polyhydroxyethers can be prepared by admixing from about 0.985 to about 1.015 moles of an epihalohydrin with one mole of a dihydric phenol together with from about 0.6 to 1.5 moles of an alkali metal hydroxide, such as, sodium hydroxide or potassium hydroxide generally in an aqueous medium at a temperature of about 10° to about 50° C. until at least about 60 mole percent of the epihalohydrin has been consumed. The thermoplastic polyhydroxyethers thus produced have reduced viscosities of at least 0.43. Reduced viscosity values were computed by use of the equation:

$$\text{Reduced viscosity} = \frac{t_s - t_0}{c t_0}$$

wherein $t_0$ is the efflux time of the solvent (tetrahydrofuran), $t_s$ is the efflux time of the polyhydroxyether solution, c is the concentration of the polyhydroxyether solution in terms of grams of polyhydroxyether per 100 ml. of tetrahydrofuran.

The dihydric phenol contributing the phenol radical residuum D, can be either a dihydric mononuclear phenol or a polynuclear phenol such as those having the general formula:

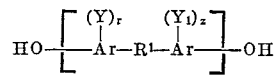

wherein Ar is an aromatic divalent hydrocarbon such as naphthalene and, preferably, phenylene, Y and $Y_1$ which can be the same or different are alkyl radicals, preferably having from 1 to 4 carbon atoms, halogen atoms, i.e., fluorine, chlorine, bromine and iodine, or alkoxy radicals, preferably having from 1 to 4 carbon atoms, r and z are integers having a value from 0 to a maximum value corresponding to the number of hydrogen atoms on the aromatic radical (Ar) which can be replaced by substituents and $R^1$ is a bond between adjacent carbon atoms as in dihydroxydiphenyl or a divalent radical including, for example,

—O—, —S—, —SO—, —SO$_2$— and —S—S—, and divalent hydrocarbon radicals such as alkylene, alkylidene, cycloaliphatic, e.g., cycloalkylene and cycloalkylidene, halogenated alkoxy or aryloxy substituted alkylene, akylidene and cycloaliphatic radicals as well as alkarylene and aromatic radicals including halogenated, alkyl, alkoxy or aryloxy substituted aromatic radicals and a ring fused to an Ar group; or $R^1$ can be polyalkoxy, or polysiloxy, or two or more alkylidene radicals separated by an aromatic ring, a tertiary amino group, an ether linkage, a carbonyl group or a sulfur containing group such as sulfoxide, and the like.

Examples of specific dihydric polynuclear phenols include among others.

The bis(hydroxyphenyl)alkanes such as 2,2-bis(4-hydroxyphenyl)propane,
2,4'-dihydroxydiphenylmethane,
bis(2-hydroxyphenyl)methane,
bis(4-hydroxyphenyl)methane,
bis(4-hydroxy-2,6-dimethyl-3-methoxyphenyl)methane,
1,1-bis(4-hydroxyphenyl)-ethane,
1,2-bis(4-hydroxyphenyl)ethane,
1,1-bis(4-hydroxy-2-chlorophenyl)ethane,
1,1-bis(3-methyl-4-hydroxyphenyl)ethane,
1,3-bis(3-methyl-4-hydroxyphenyl)propane,
2,2-bis(3-phenyl-4-hydroxyphenyl)propane,
2,2-bis(3-isopropyl-4-hydroxyphenyl)-propane,
2,2-bis(2-isopropyl-4-hydroxyphenyl)propane,
2,2-bis(4-hydroxynaphthyl)propane,
2,2-bis(4-hydroxyphenyl)pentane,
3,3-bis(4-hydroxyphenyl)pentane,
2,2-bis(4-hydroxyphenyl)heptane,
bis(4-hydroxyphenyl)phenylmethane,
bis(4-hydroxyphenyl)cyclohexylmethane, 1,2-bis(4-hydroxyphenyl)-1,2-bis(phenyl)propane,
2,2-bis(4-hydroxyphenyl)-1-phenyl-ppropane and the like;

Di(hydroxyphenyl)sulfones such as bis(4-hydroxyphenyl)-sulfone,
2,4'-dihydroxydiphenyl sulfone,
5'-chloro-2,4'-dihydroxydiphenyl sulfone,
5'-chloro-4,4-dihydroxydiphenyl sulfone, and the like;

Di(hydroxyphenyl)ethers such as bis(4-hydroxyphenyl)-ether,
the 4,3'-, 4,2ı-, 2,2'-, 2,3'-dihydroxydiphenyl ethers,
4,4'-dihydroxy-2,6-dimethyldiphenyl ether,
bis(4-hydroxy-3-isobutylphenyl)ether,
bis(4-hydroxy-3-isopropylphenyl)ether,
bis(4-hydroxy-3-chlorophenyl)ether,
bis(4-hydroxy-3-fluorophenyl)ether,
bis(4-hydroxy-3-bromophenyl)ether,
bis(4-hydroxynaphthyl)ether,
bis(4-hydroxy-3-chloronaphthyl)ether,
bis(2-hydroxydiphenyl)-ether,
4,4'-dihydroxy-2,6-dimethoxydiphenyl ether,
4,4'-dihydroxy-2,5-diethoxydiphenyl ether, and the like.

Also suitable are the bisphenol reaction products of 4-vinylcyclohexene and phenols e.g., 1,3-bis(p-hydroxyphenyl)-1-ethylcyclohexane, and the bisphenol reaction products of dipentene or its isomers and phenols such as 1,2 - bis(p - hydroxyphenyl) - 1 - methyl-4-isopropylcyclohexane as well as bisphenols such as 1,3,3-trimethyl-1-(4-hydroxyphenyl)-6-hydroxyindane, and 2,4-bis(4-hydroxyphenyl)-4-methylpentane, and the like.

Particularly desirable dihydric polynuclear phenols have the formula

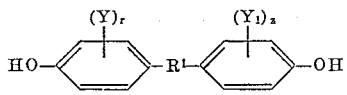

wherein Y and $Y_1$ are as previously defined, $r$ and $z$ have values from 0 to 4 inclusive and $R^1$ is a divalent saturated aliphatic hydrocarbon radical, particularly alkylene and alkylidene radicals having from 1 to 3 carbon atoms, and cycloalkylene radicals having up to and including 10 carbon atoms.

Mixtures of dihydric phenols can also be employed and whenever the term "dihydric phenol" or "dihydric polynuclear phenol" is used herein, mixtures of these compounds are intended to be included.

The epoxide contributing the hydroxyl containing radical residuum, E, can be a monoepoxide or diepoxide. By "epoxide" is means a compound containing an oxirane group, i.e., oxygen bonded to two vicinal aliphatic carbon atoms, thus

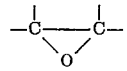

A monoepoxide contains one such oxirane group and provides a radical residuum E containing a single hydroxyl group, a diepoxide contains two such oxirane groups and provides a radical residuum E containing two hydroxyl groups. Saturated epoxides, by which term is meant diepoxides free of ethylenic unsaturation, i.e., $>C=C<$ and acetylenic unsaturation, i.e., $—C≡C—$, are preferred. Particularly preferred are halogen substituted saturated monoepoxides, i.e., the epihalohydrins and saturated diepoxides which contain solely carbon, hydrogen and oxygen, especially those wherein the vicinal or adjacent carbon atoms form a part of an aliphatic hydrocarbon chain. Oxygen in such diepoxides can be, in addition to oxirane oxygen, ether oxygen —O—, oxacarbonyl oxygen

carbonyl oxygen

and the like.

Specific examples of monoepoxides include epichlorohydrins such as epichlorohydrin, epibromohydrin, 1,2-epoxy - 1-methyl - 3 - chloropropane, 1,2-epoxy-1-butyl-3-chloropropane, 1,2-epoxy-2-methyl-3-fluoropropane, and the like.

Illustrative diepoxides include diethylene glycol bis-(3,4-epoxycyclohexane-carboxylate),
bis-3,4-epoxycyclohexylmethyl)-adipate,
bis(3,4-epoxycyclohexylmethyl)phthalate,
6-methyl-3,4-epoxycyclohexylmethyl-6-methyl-3,4-
  epoxycyclohexane carboxylate,
2-chloro-3,4-epoxycyclohexylmethyl-2-chloro-3,4-
  epoxycyclohexane-carboxylate,
digylcidyl ether,
bis(2,3-epoxycyclopentyl)ether,
1,5-pentanediol bis(6-methyl-3,4-epoxycyclohexylmethyl)
  ether,
bis(2,3-epoxy-2-ethylhexyl)adipate,
diglycidyl maleate,
diglycidyl phthalate,
3-oxatetracyclo[4.4.0.1$^{7,10}$.0$^{2,4}$]-undec-8-yl 2,3-epoxypropyl ether,
bis(2,3-epoxycyclopentyl)sulfone,
bis(3,4-epoxyhexoxypropyl)sulfone,
2,2'-sulfonyldiethyl bis(2,3-epoxycyclopentanecarboxylate),
3-oxatetracyclo[4.4.0.1$^{7,10}$.0$^{2,4}$]-undec-8-yl 2,3-epoxybutyrate,
4-pentenal-di-(6-methyl-3,4-epoxycyclohexylmethyl)
  acetal,
ethylene glycol bis(9,10-epoxystearate),
diglycidyl carbonate,
bis(2,3-epoxybutylphenyl)-2-ethylhexyl phosphate, diepoxydioxane, butadienedioxide, and 2,3-dimethyl butadiene dioxide. The preferred diepoxides are those wherein each of the oxirane groups is connected to an electron donating substituent which is not immediately connected to the carbon atoms of that oxirane group. Such diepoxides having the grouping

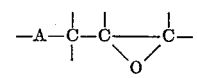

wherein A is an electron donating substituent such as $$—O—, \quad —\underset{Q}{N}—, \quad —S—, \quad —SO—, \quad —SO_2—, \quad —\overset{O}{\underset{}{C}}—O—, \quad \text{or} \quad —\underset{\underset{Q}{SO_2}}{N}—$$

and Q is a saturated hydrocarbon radical such as an alkyl, cycloalkyl, aryl or aralkyl radical.

While not intending to be bound by any particular theory or explanation, it is believed that the unusually high flexural moduli exhibited by the modified thermoplastic polyhydroxy-ethers of the present invention are attributable to the refinement of the asbestos modifier which results in an opening of asbestos fiber bundles. This opening phenomenon is accompanied by increased surface area and facilitates wetting of the asbestos surface by the polyhydroxyether while in the molten state.

The refined asbestos used in this invention is obtained by the dispersion of the asbestos in water to break up the asbestos fibrous mass into small clusters of asbestos fibers and to some extent into minute individual fibers.

Water-dispersion of the asbestos is preferably obtained through agitation of asbestos in water in the presence of a chemical dispersing agent, such as aluminum chloride. This dispersion technique is described in U.S.P. 1,907,616 and U.S.P. 2,661,287, for example. Additional methods of dispersing the asbestos employing chemical dispersing agents are described in U.S. 2,626,213 and U.S. 2,652,325. These small clusters and minute fibers preferably contain surface electrical charges which aid in maintaining the dispersed state. When dispersing agents such as aluminum chloride and ferric chloride are used, the water-dispersed asbestos has electro-positive surface charges.

Dispersion of asbestos fibers in water will generally remove substantially all of the impurities, such as colorants, gangue and abrasive materials. This is especially true if chemical dispersing agents are employed. The presence of abrasive materials or electrical conductors, such as magnetite, in the asbestos can cause difficulty in subsequent processing steps for the production of modified thermoplastic polyhydroxyethers.

The preferred asbestos for use in the present invention is chrysotile, but other forms, such as anthophyllite and amosite, can also be used. The chrysotile is further preferably obtained from asbestos deposits near Coalinga, Calif. This latter material is composed of a large proportion of short fiber asbestos which is readily dispersed into substantially individual fibers. It is conventional among most asbestos producers to classify chrysotile asbestos fibers by fiber length into short, medium and long using the Quebec Standard Test and to price them accordingly, with the short the cheapest and the long the most expensive.

An aqueous suspension of water-dispersed asbestos can be flocculated by the addition of any acid or base which will adjust the pH of the dispersed asbestos slurry to a value outside the range of about 2 to 7.5. An alternate means of flocculation is the addition of an interfering or flocculating ion, such as sulfate, nitrate or phosphate. The flocculated asbestos can be "redispersed" to a colloidal suspension, if desired, by adjusting the pH to a value within the range of about 2 to 7.5 or by removing the interfering ion. Useful flocculants are hydrochloric acid, sulfuric acid, sodium carbonate, aluminum sulfate, ammonium hydroxide, sodium hydroxide and the like. Such flocculated fibers can then be filtered and dried. This compacted form of water-dispersed asbestos can be introduced "as is" directly to molten thermoplastic polyhydroxyether for production of the modified polymer. Alternatively, the compacted water-dispersed asbestos can be broken up into fluffy material by mechanical means, such as a hammer mill, before introducing it into the polyhydroxyether.

The water-dispersed asbestos useful in the present invention can be conveniently characterized in terms of its flocculated and dried form. Measurements are generally made on an "opened" form of the product.

In the following description of characterization tests, the asbestos fibers, before being tested, are generally opened by one pass through a laboratory size Mikro-pulverizer employing a screen with 0.046 in. slots.

DRY BULK DENSITY

Opened asbestos fiber is loaded into a tared standard volume (12 in. x 12 in. x 12 in.) after passing the fiber through a 19 in. long fluffing column. The distance from the bottom of this column to the receiving container is 12 inches. The container is filled so that a 6-inch peak stands up above the top. This peak is carefully removed with a straight-edge and the gross weight of the container is determined. By subtracting the tare weight, the weight of asbestos is obtained directly in pounds per cubic foot. Water-dispersed asbestos useful in the process of the present invention should have a dry bulk density obtained in this manner of less than about 6 pounds per cubic foot. Preferably the dry bulk density is less than about 3 pounds per cubic foot. Non-dispersed prior art asbestos fibers generally had a dry bulk density of greater than about 6 pounds per cubic foot and generally about 7–8 pounds per cubic foot.

WET BULK VOLUME

Twenty grams of opened asbestos fibers are placed in a 1-liter graduated cylinder and sufficient water is added to form 1-liter of asbestos-water slurry. The cylinder is then inverted ten times to insure uniform mixing. The cylinder is then set in an upright position and allowed to settle for three hours. At the end of this time the volume of the bulked asbestos is read in milliliters. Water-dispersed asbestos useful in the present invention should have a value greater than about 300 ml. and preferably greater than about 500 ml. Non-dispersed asbestos fiber generally has a value less than about 300 ml. and quite frequently below about 200 ml. in this test.

The sensitivity of the Wet Bulk Volume test described above can be increased by additional mechanical agitation of the asbestos-water slurry. In this version of the Wet Bulk Volume test, forty grams of opened asbestos are mixed with water to form two liters of asbestos-water slurry. This slurry is then placed in a well known pulp disintegrator and agitated and beaten for 2 min. The disintegrator is described in TAPPI (Technical Association of the Pulp and Paper Industry) Standard T–205–m–58, Appendix A. The slurry is then discharged, divided substantially in half and poured into two separate 1-liter graduated cylinders. Additional water is added to each cylinder to form 1-liter portions of asbestos-water slurries. These cylinders are then inverted and allowed to stand according to the above described procedure. Water-dispersed asbestos results in a bulked asbestos volume of greater than 900 ml. in this test while non-dispersed asbestos has wet bulk volume less than about 500 ml. in this test.

OIL ADSORPTION

A 5 gram sample of asbestos fibers is placed in a 500 ml. mortar. Di-octyl phthalate (DOP) is added dropwise from a graduated burette to the asbestos in the mortar. The resulting mixture is ground between the mortar and a pestle until sufficient DOP has been added to cause formation of a paste that adheres to the pestle. The end point is taken at the time when all of the asbestos-DOP mixture adheres to the pestle. Since oil adsorption data for prior art asbestos are generally based on a 10-gram asbestos sample, the measured quantity of DOP absorbed on the 5-gram sample is multiplied by 2 to give the results in milliliters DOP/10 grams of fiber for comparison purposes. Dispersed asbestos filter useful in the present invention should have an oil adsorption value greater than about 14 milliliters DOP/10 grams of opened fiber. Prior art non-dispersed opened asbestos fibers had an oil adsorption of about 8–10 milliliters DOP/10 grams of filter.

REFLECTANCE

Three to five grams of asbestos fiber are rapidly agitated in about 300 to 500 ml. of clear water. The resulting slurry is vacuum filtered to produce a uniform filter cake. The filter cake is oven-dried at 105° C., preferably calendered, and the reflectance measured on the top and bottom surfaces of the resulting product. Reflectance is measured according to TAPPI Standard T–452–m–58 and reported as percent of ultimate reflectance based on magnesium oxide as 100 percent reflectance. Dispersed asbestos useful in the present invention should preferably have an average reflectance value based on the top and bottom readings greater than about 72 percent. The useful reflectance range is about 70 to about 80 percent. Prior art non-dispersed asbestos fiber had average reflectance values in the range of about 48 to about 72 percent.

MAGNETIC FRACTION

This determination is made by mixing a small portion of opened asbestos fiber in water to form a thin pulp slurry and then removing magnetic material from this slurry with a magnet. The magnetic material thus obtained is then mixed with water to form a new pulp and this pulp is then cleaned of magnetic material with a magnet. The resulting material attracted to the magnet is designated as cleaned magnetics. The percent magnetic fraction is then determined as follows:

$$\frac{\text{Weight of cleaned magnetics}}{\text{Weight of original sample}} \times 100 = \text{percent magnetic fraction}$$

Dispersed asbestos useful in the present invention should have a magnetic fraction less than about 1.0 weight percent and preferably less than about 0.5 weight percent. Prior art non-dispersed asbestos had magnetic fractions greater than 1.0 weight percent and generally greater than 2.0 weight percent. The test for magnetic fraction can conveniently be carried out on the pulp sample employed above for measurement of wet bulk density.

An alternate method can be used to measure the magnetic fraction of the asbestos. This method involving the electromagnetic properties of asbestos is described in ASTM (American Society for Testing Materials) Standard D 1118–57. The water-dispersed asbestos useful in the present invention should have a magnetic fraction less than about 1.0 weight percent and preferably less than about 0.5 weight percent as measured by this latter technique.

The composition of the present invention can include the usual additives for thermoplastic resins such as pigments, colorants, opacifiers, lubricants, extenders and the like, without materially affecting the properties of the composition.

The particular mode of incorporation of the thermoplastic polyhydroxyether with the refined asbestos is not generally critical for many applications such as molding compositions, where blending, tumbling, stirring, milling and like techniques of intimate mixing can be used.

The following examples illustrate the compositions of the present invention. All parts and percentages are by weight unless otherwise stated.

Example 1

The thermoplasticpolyhydroxyether used was prepared by the reaction of equimolar amounts of 2,2-bis(4-hydroxyphenyl)-propane and epichlorohydrin together with sodium hydroxide. Equipment used was a vessel provided with an agitator, thermometer, and reflux means. There was placed in the vessel:

| | Parts |
|---|---|
| 2,2-bis(4-hydroxyphenyl)propane | 114.5 |
| Epichlorohydrin (99.1%) pure | 46.8 |
| Ethanol | 96.0 |
| Butanol | 10.0 |
| Sodium hydroxide (97.5%) pure | 22.6 |
| Water | 70.0 |

The thermoplastic polyhydroxyether used was prepared for 16 hours to accomplish the initial coupling reaction. The mixture was then heated at 80° C. for an hour. Sixty parts of a 7:3 mixture of toluene:butanol was added to the vessel. Heating of the mixture at 80° C. was continued another two hours. There was added to the vessel an additional 50 parts of the 7:3 toluene:butanol mixture and 4.5 parts of phenol. The contents of the vessel were continued heated at 80° C. (reflux) for 2½ hours. Upon cooling, the reaction mixture was cut with 200 parts of the 7:3 toluene:butanol mixture. One hundred parts of water was added to the vessel and agitated with the contents to dissolve salts present in the reaction mixture. The vessel contents were allowed to settle for ten minutes during which time a lower brine phase formed. The lower phase was separated by decantation. The upper polymer solution containing phase was washed successively with two 160 part portions of water and a mixture of 85% phosphoric acid with 100 parts of water (pH=2) for one hour. The upper polymer solution phase was again separated by decantation and water washed with four successive 200 part portions of water containing 4.5% butanol.

The washed polymer was then coagulated in isopropanol, filtered and dried. There was thus obtained a thermoplastic polyhydroxyether of 2,2-bis(4 - hydroxyphenyl)propane and epichlorohydrin having a melt flow of 7.0 decigrams per minutes. Melt flow of the thermoplastic polyhydroxyether was determined by weighting in grams the amount of polyhydroxyether which, at a temperature of 220° C. and under a pressure of 44 p.s.i., flowed through an orifice having a diameter of 0.825″ and a length of 0.315″ over a ten minute period. Four such determinations were averaged and reported as decigrams per minute under a pressure of 44 p.s.i. and at 220° C.

Example 2

Compression molded specimens of modified thermoplastic polyhydroxyether compositions prepared by intimately blending 40% by weight of different types of asbestos fibers including Coalinga Standard (unrefined) and Coalinga Highly Refined (short fiber-low bulk density and short fiber-highly opened asbestos) with thermoplastic polyhydroxyether in a 2 roll mill at 160° C., were subjected to flexural modulus and flexural strength measurements. The specimens in all cases were smooth, glossy, black and opaque. The resultant data collected in Table I demonstrate the superiority of Highly Refined Coalinga asbestos over other unrefined short fiber types and even over the more expensive medium and long fiber types.

The classification of asbestos fibers and the Quebec Standard Testing Machine used for this classification are described in the Encyclopedia of Chemical Technology, vol. 2, p. 138, 1960, Interscience Publishers, NYC.

The Quebec Standard Testing Machine, consisting of three stacked screens, 24½″ x 14¾″ x 3½″, and a pan resting on a table driven by an eccentric gear with a 25⁄32″ throw and a 1 9⁄16″ travel, separates 16 oz. samples of asbestos in two minutes of shaking into 4 fractions, viz., ½″ mesh, 4 mesh, 10 mesh and pan. Floats are finer than the short fibers and are not characterized closely.

TABLE I

| Asbestos Description | Flexural Modulus, p.s.i. | Flexural Strength, p.s.i. |
|---|---|---|
| Long fiber—well opened | 1,000,000 | 15,300 |
| Med. fiber—semicrudy | 960,000 | 13,700 |
| Short fiber—low bulk | 930,000 | 13,660 |
| Short fiber—high bulk | 1,050,000 | 14,400 |
| Float—high bulk | 850,000 | 13,140 |
| Float—very high bulk | 880,000 | 12,780 |
| Coalinga Standard Short fiber—low bulk | 890,000 | 11,940 |
| Coalinga Highly Refined Short fiber—highly opened and dispersed | 1,280,000 | 17,670 |

Example 3

Test specimens obtained by injection molding thermoplastic polyhydroxyether compositions modified with 40% by weight of Highly Refined Coalinga asbestos fibers were subjected to a series of physical and electrical tests. As in the case of the compression molded specimens, the injection molded specimens were smooth, glossy, black, and opaque. The results are tabulated in Table II. The flexural modulus values obtained with injection molded specimens are about 20% higher than those obtained with compression molded specimens.

TABLE II

| Test | ASTM No. | Value |
|---|---|---|
| Flexural Modulus, p.s.i. | D 790-61T | 1,600,000 |
| Flexural Strength, p.s.i. | D 790-61T | 17,500 |
| ⅛ Notched Izod, ft.-lbs./in. | D 256-56 | 0.5 |
| Heat Dist. Temp. 264 p.s.i., °C. | D 648-56 | 93.8 |
| Specific Gravity, g./cc. | D 1505-57T | 1.51 |
| Coefficient of Thermal Exp., in./in./°C. | D 696-44 | $1.94 \times 10^{-5}$ |
| Tensile Strength, p.s.i. | D 638-61T | 12,200 |
| Tensile Modulus, p.s.i. | D 638-61T | 1,660,000 |
| Dielectric Constant: | D 150-54T | |
| 60 cycles | | 5.80 |
| 1 kc | | 5.43 |
| 1 mc | | 4.29 |
| Dissipation Factor: | D 150-54T | |
| 60 cycles | | $48.7 \times 10^{-3}$ |
| 1 kc | | $27.5 \times 10^{-3}$ |
| 1 mc | | $55.3 \times 10^{-3}$ |
| Arc Resistance, seconds | D 495-56 | 126 |

Examples 4 and 5

Essentially similar results as described in Examples 2 and 3 are obtained with modified thermoplastic polyhydroxyether compositions containing 30% and 50% by weight respectively of asbestos fibers.

Although the invention has been described in its preferred forms with a certain degree of particularity, it is understood that the present disclosure has been made only by way of example, and that numerous changes may be resorted to without departing from the spirit and scope of the invention.

What is claimed is:

1. Thermoplastic compositions having high flexural moduli in excess of $1.0 \times 10^6$ p.s.i. consisting essentially of:
   (a) thermoplastic polyhydroxyether having the general formula:

   $$\{D\!-\!O\!-\!E\!-\!O\}_n$$

wherein D is the radical residuum of a dihydric phenol, left after removal of phenolic hydroxyl groups, E is an hydroxyl containing radical residuum of an epihalohydrin having the structure $-CH_2CHOHCH_2-$, and $n$ represents the degree of polymerization and is at least 30, the reduced viscosity of said thermoplastic polyhydroxyether when measured in tetrahydrofuran being at least 0.43; and
   (b) from about 30 to 50% based on the weight of thermoplastic polyhydroxyether, of refined water-dispersed and opened asbestos fibers having an average wet bulk volume greater than about 300 ml., an average dry bulk density of less than about 6 lbs./cu. ft., an oil adsorption greater than about 14 ml. dioctyl phthalate/10 grams of asbestos, an average reflectance of greater than about 72% and a magnetic fraction less than about 1.0 weight percent.

2. The composition claimed in claim 1 wherein D is the radical residuum of a bis(4-hydroxyphenyl)propane.

3. The composition claimed in claim 2 wherein the bis-(4-hydroxyphenyl)propane is 2,2-bis(4-hydroxyphenyl)propane and $n$ is at least 80.

4. The composition claimed in claim 1 wherein the epihalohydrin is epichlorohydrin.

5. The composition claimed in claim 1 wherein the asbestos fibers are chrysotile fibers.

6. The composition claimed in claim 1 containing about 40% of asbestos based on the weight of thermoplastic polyhydroxyether.

7. Shaped structure formed from the thermoplastic composition claimed in claim 1.

References Cited
UNITED STATES PATENTS
3,225,118  12/1965  De Melio _____ 260—47
3,294,747  12/1966  Fry _____ 260—47

MORRIS LIEBMAN, *Primary Examiner.*

L. T. JACOBS, *Assistant Examiner.*